United States Patent [19]

Abeler et al.

[11] 4,196,110
[45] Apr. 1, 1980

[54] STABILIZED MOULDING MATERIAL

[75] Inventors: Gerd Abeler, Griesheim über Darmstadt; Rainer Schneider, Bensheim-Auerbach, both of Fed. Rep. of Germany

[73] Assignee: Ciba-Geigy Corporation, Ardsley, N.Y.

[21] Appl. No.: 971,272

[22] Filed: Dec. 20, 1978

[30] Foreign Application Priority Data

Dec. 29, 1977 [CH] Switzerland .................. 16182/77

[51] Int. Cl.² .................... C08K 5/09; C08K 5/13; C08K 5/15; C08K 5/34
[52] U.S. Cl. .................... 260/23 XA; 260/45.75 R; 260/45.75 W; 260/45.8 A; 260/45.8 N; 260/45.85 R; 260/45.95 J
[58] Field of Search .................... 260/45.8 N

[56] References Cited
U.S. PATENT DOCUMENTS

| | | | |
|---|---|---|---|
| 2,985,619 | 5/1961 | Roos et al. | 260/45.8 NT |
| 3,007,895 | 11/1961 | Roos et al. | 260/45.8 N |
| 3,222,317 | 12/1965 | Kauder | 260/45.75 T |
| 3,458,472 | 7/1969 | Kauder | 260/45.8 N |
| 3,867,325 | 2/1975 | Hutton | 260/45.7 PH |
| 3,888,818 | 6/1975 | Deblandre et al. | 260/45.8 N |

Primary Examiner—Hosea E. Taylor
Assistant Examiner—R. A. White
Attorney, Agent, or Firm—Luther A. R. Hall

[57] ABSTRACT

Mono- or bistetrazoles of the formula I

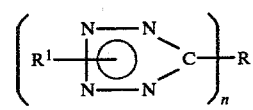

wherein n is 1 or 2, $R^1$ represents hydrogen or a monovalent hydrocarbon radical and R represents a monovalent or divalent hydrocarbon radical which can be interrupted by oxygen, NY, sulfur, $SO_2$ and/or $CO_2$ or substituted by OH or SH, and wherein Y represents hydrogen or a monovalent hydrocarbon radical. These compounds, especially when used in combination with epoxy plasticizers and/or metal salt stabilizers, are outstanding heat stabilizers for chlorine-containing thermoplastics, especially for PVC. Particular interest attaches to the combinations of tetrazoles with epoxy plasticizers, for example epoxidized soya bean oil, which constitute a metal-free stabilizer system.

11 Claims, No Drawings

STABILIZED MOULDING MATERIAL

The present invention relates to the stabilising of chlorine-containing thermoplastics by the addition of a tetrazole compound in combination with a co-stabiliser.

It is known that chlorine-containing polymers have to be protected against the harmful influence of light and heat, for example during their processing to moulded articles. It is also known to use 5-aminotetrazole and derivatives thereof, for example salts or carboxamides, for this purpose (cf. German Auslegeschrift No. 1,134,197). The stabilising properties imparted by this compound, however, are insufficient for the exigencies of actual practice and there is a need to provide improvements in this respect.

It has now been found that specific mono- or bistetrazoles effect a good stabilisation of chlorine-containing thermoplastics and that this action can be substantially intensified by specific co-catalysts. Epoxy plasticisers or metal stabilisers can be used as co-stabilisers. Accordingly, the present invention provides a moulding material consisting of a chlorine-containing thermoplastic into which there is incorporated an effective amount of a tetrazole heat stabiliser, said moulding compound containing an epoxy plasticizer and/or at least one carboxylate or phenolate of barium, cadmium, zinc or calcium and, as heat stabiliser, at least one mono- or bistetrazole of the formula I

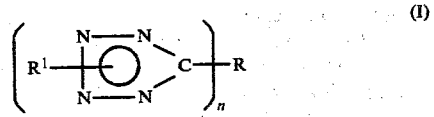 (I)

wherein $R^1$ represents a hydrogen atom, alkyl of 1 to 4 carbon atoms, cycloalkyl of 5 or 6 carbon atoms, phenyl, or phenyl which is substituted by alkyl or 1 to 4 carbon atoms or halogen, n is 1 to 2, and, when n is 1, R represents alkyl of 1 to 20 carbon atoms which can be interrupted by oxygen, —NY—, sulfur, $SO_2$ and/or $CO_2$, or substituted by —OH or —SH, or represents phenyl or benzyl which can be substituted by alkyl of 1 to 4 carbon atoms, or is cycloalkyl of 5 or 6 carbon atoms, and, when n is 2, R represents a direct bond, alkylene of 1 to 10 carbon atoms which can be substituted by phenyl, benzyl, hydroxyl, alkoxy of 1 to 4 carbon atoms, acyloxy of 1 to 20 carbon atoms, phenylsulfonyl or alkylsulfonyl, or interrupted by oxygen, sulfur, $SO_2$, $CO_2$ or —NY—, or represents alkylidene of 1 to 10 carbon atoms, phenylene, benzylene or xylylene, and Y represents hydrogen, alkyl of 1 to 4 carbon atoms, phenyl, benzyl, naphthyl, cyclohexyl or acyl of 1 to 20 carbon atoms. A further object of the invention is a method of stabilising a chlorine-containing thermoplastic against degradation by the action of light and/or heat, which comprises incorporating thereinto a mono- or bistetrazole of the formula I together with at least one co-stabiliser.

$R^1$ as alkyl of 1 to 4 carbon atoms can be methyl, ethyl, propyl, isopropyl, butyl or isobutyl. $R^1$ as cycloalkyl of 5 to 6 carbon atoms can be cyclopentyl or cyclohexyl. $R^1$ as substituted phenyl can be for example tolyl, xylyl or 3-chlorophenyl. $R^1$ is preferably alkyl of 1 to 4 carbon atoms, phenyl and, in particular, a hydrogen atom.

When n is 1, R can be linear or branched alkyl of 1 to 20, preferably 1 to 12, in particular 1 to 8 and most preferably 1 to 6, carbon atoms, which can be interrupted or substituted. As alkyl, R can be for example methyl, ethyl, propyl, isopropyl, butyl, pentyl, hexyl, 2-ethylhexyl, octyl, dodecyl, hexadecyl, octadecyl or eicosyl.

R as alkyl which is interrupted by oxygen, —NY—, sulfur, $SO_2$ and/or $CO_2$, preferably by oxygen, sulfur and/or $CO_2$, or which is substituted by OH or SH, can be for example: alkoxyalkyl, alkylthiaalkyl, alkyloxycarbonylalkyl, alkylcarbonyloxyalkyl or alkylsulfonylalkyl, hydroxyalkyl, mercaptoalkyl, such as methoxyethyl, ethoxymethyl, propoxypropyl, butoxyethyl, octoxyethyl, octadecyloxyethyl, methylthioethyl, hexylthioethyl, propylsulfonylethyl, dimethylaminoethyl, diethylaminomethyl, methoxycarbonylmethyl, dodecyloxycarbonylethyl, ethylcarbonyloxyethyl, hydroxyethyl, hydroxypropyl, hydroxybutyl, hydroxyhexyl and corresponding alkyl which contains mercapto groups. Preferred SH-alkyl is in this connection β-alkoxyalkyl, alkylthioalkyl, mercaptoalkyl or hydroxyalkyl.

R as cycloalkyl of 5 or 6 carbon atoms can be cyclopentyl or cyclohexyl. R as phenyl or benzyl which is substituted by alkyl of 1 to 4 carbon atoms can be toluyl, ethylphenyl, methylbenzyl or butylbenzyl. When n is 2, then R in formula I can be linear or branched alkylene of preferably 1 to 8, most preferably 1 to 6, carbon atoms, which can be substituted or unsubstituted or interrupted in the chain of atoms. Linear and branched alkylene is for example methylene, ethylene, 1,2- or 1,3-propylene, 1,2-, 1,3- or 1,4-butylene, 1,5-pentylene, neopentylene, 1,5-hexylene, 1,4-heptylene, 1,2- or 1,6-octylene, 1,2- or 1,10-decylene.

R as substituted alkylene is preferably alkylene which is substituted by phenyl, hydroxyl or acyloxy of 1 to 18 carbon atoms. Examples of substituted alkylene are 2-phenyl-1,3-propylene, 1,2-diphenylethylene, benzylmethylene, 2-hydroxy-1,3-propylene, 3-formyloxypentylene, 2-propionyloxy-1,3-propylene, 2-oxtadecyloxy-1,3-propylene, 2-methoxy-1,3-propylene, 3-phenyl-3-phenylsulfonyl-1,5-pentylene. Alkylene substituted by alkylsulfonyl contains preferably 1 to 4 carbon atoms.

R as alkylene can also be interrupted by oxygen, sulfur, $SO_2$, $CO_2$ or —NY—, preferably by oxygen sulfur or —NY—. Y is preferably a hydrogen atom, alkyl of 1 to 4 carbon atoms, phenyl or acyl of 1 to 18 carbon atoms. Examples are radicals of the formula

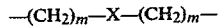

wherein X is oxygen, sulfur, $SO_2$, $CO_2$ or —NY— and m is an integer from 1 to 6, preferably 1 or 2. Y as alkyl can be methyl, ethyl, propyl or butyl, and, as acyl, can be acetyl, propionyl, hexanoyl, benzoyl, oleoyl, lauroyl.

When n is 2, R can also be alkylidene of 2 to 10, preferably 2 to 8, in particular 2 to 6, carbon atoms. Examples are ethylidene, 1,1- or 2,2-propylidene, 1,1- or 2,2-butylidene, 1,1-, 2,2- or 3,3-pentylidene, hexylidene, octylidene, decylidene. When R is 2, R can also be phenylene, benzylene or xylylene. Preferred radicals in this connection are the divalent meta- or para-radicals, for example m- or p-phenylene or m- or p-xylylene.

A preferred subgroup of the mono- or bistetrazoles of the formula I comprises those compounds in which n is 1 and R represents alkyl or hydroxyalkyl of 1 to 6 carbon atoms, or in which n is 2 and R represents alkylene of 2 to 6 carbon atoms which can be interrupted by oxygen or sulfur or substituted by hydroxyl, or is phenylene, benzylene or xylylene.

A particularly preferred group of bistetrazoles of the formula I comprises those compounds wherein n is 2, $R^1$ is a hydrogen atom and $R^2$ is alkylene of 2 to 4 carbon atoms or 3-thiapentylene.

The mono- or bistetrazoles of the formula I are known or they can be obtained by methods analogous to those described in German Offenlegungsschrift No. 2,731,323 or in J. Amer. Chem. Soc. 80, 3908 (1958), by the reaction of mononitriles of the formula R—CN, or dinitriles of the formula $R(CN)_2$, with hydrazoic acid (or a salt thereof in an acid reaction medium).

Compounds in which $R^1$ in formula I is not a hydrogen atom are obtained by the reaction of carboxamides of the formula $R-(CO-NH-R^1)_y$ (in which y is 1 or 2) with $PCl_5$ or $SOCl_2$ and subsequent reaction of the resulting imide chlorides with alkali azide, as described in Chem. Ber. 42, (1909) 2336 and 74, (1941), 264.

The mono- and bistetrazoles of the formula I are incorporated in the chlorine-containing thermoplastics to be stabilised, before processing in conventional machines, usually in amounts of 0.01 to 5, preferably 0.1 to 3, percent by weight, based on the weight of the thermoplastics. By themselves they have a stabilising action; however, this action does not suffice in actual practice. Surprisingly, however, when the mono- and bistetrazoles of the formula I are used together with epoxidised plasticisers, it has been found that a synergistic action results, which makes a broad use possible in actual practice.

The plasticisers can be used in those amounts which are necessary for adjusting desired properties in plasticised chlorine-containing thermoplastics. When used only as co-stabilisers, they are employed usually in amounts of at least 0.05% by weight, preferably 0.05 to 10 and especially 0.1 to 5% by weight, based on the weight of the chlorine-containing thermoplastics. It is advantageous to employ the mono- and bistetrazoles of the formula I and the epoxidised plasticiser in a ratio of about 1:.05 to 1:10, preferably 1:1 to 1:8.

Preferred epoxidised plasticisers are the esters of acids having olefinic unsaturation with monofunctional or polyfunctional alcohols and the double bonds of which have been epoxidised. The acids contain preferably 12 to 22 carbon atoms, and the alcohols 1 to 30, especially 1 to 20, carbon atoms. Preferred acids are in particular oleic acid, and also elaidic acid or linoleic acid. Examples are epoxidised butyl or octyl oleate, but especially epoxidised soya bean oil.

Surprisingly, metal stabilisers of barium, calcium, zinc and cadmium can also be used as synergistic cos-tabilisers. They are preferably incorporated in an amount of 0.05 to 5% by weight, especially 0.1 to 3% by weight. The ratio of tetrazole to metal stabiliser can be about 2:1 to 1:8.

Suitable metal stabilisers are the carboxylates or phenolates of barium, calcium, zinc or cadmium. The phenols can contain 6 to 20 carbon atoms and the carboxylic acids preferably 8 to 20 carbon atoms. Mixtures of barium and cadmium or calcium and zinc salts are particularly advantageous. Vinyl chloride polymers or copolymers are preferably used for the moulding materials of the invention. Suspension and mass polymers, and emulsion polymers having a low content of emulsifier, are preferred. Examples of suitable commonomers for the copolymers are: vinylidene chloride, transdichloroethene, ethylene, propylene, butylene, maleic acid, acrylic acid, fumaric acid, itaconic acid. Further suitable chlorine- containing polymers are post-chlorinated polyolefins.

The thermoplastics of the present invention are obtained by known methods by incorporating the stabilisers and, if desired, further stabilisers, in the polymer. A homogeneous mixture of stabiliser and polyvinyl chloride can be obtained, for example, using a two-roll mixer at 150° to 210° C. Depending on the end use of the moulding material, further additives can also be incorporated before or simultaneously with the incorporation of the stabiliser. Examples of further additives are: lubricants, preferably montan waxes or glycerol esters, plasticisers, fillers, modifiers (such as impact strength additives), pigments, light stabilisers, UV absorbers, antioxidants or further co-stabilisers, for example phosphites. The thermoplastics of the invention can be processed to moulded articles by the conventional moulding methods, for example by extrusion, injection moulding or calendering. The use as plastisols is also possible.

The heat stabilising effect obtained with the metal-free stabilisers is outstanding in the thermoplastics of the invention and is at least comparable with or better than that of the known effective sulfur-containing aminocrotonates. The light stability is also outstanding.

The invention is illustrated in more detail by the following Examples in which the parts and percentages are by weight.

EXAMPLE 1

The moulding material is a dry blend consisting of 100 parts of S-PVC (K-value 64), 20 parts of dioctyl phthalate, 4 parts of epoxidised soy bean oil (Reoplast 39), and 0.5 part of phosphite stabiliser (Irgastab CH 300). Then 1.5 parts of tetrazole stabiliser are mixed in for 5 minutes at 170° C. on a mixer roll and a rolled sheet with a thickness of 0.3 mm is obtained.

Samples of the sheet are taken and subjected to heat in an oven at 180° C. and every 15 minutes the thermal ageing of a sample is determined according to the Yellowness Index (YI) of ASTM D 1925-70. The results are reported in Table 1.

Table 1

| Tetrazole | time (in min.) | 15 | 30 | 45 | 60 | 75 | 90 |
|---|---|---|---|---|---|---|---|
| Composition without tetrazole | | 13 | 82 | >100 | | | |
| T—$(CH_2)_2$—$NC_6H_5$—$(CH_2)_2$—T* | | 6 | 20 | 34 | 61 | 83 | >100 |
| T—$(CH_2)_2$—O—$(CH_2)_2$—T | | 4 | 9 | 27 | 85 | >100 | |
| T—$CH_2$—O—$CH_2$—T | | 5 | 22 | 62 | 100 | | |
| T—$CH_2$—$CHOHCH_2$—T | | 5 | 23 | 46 | 57 | >100 | |

Yellowness Index after ageing at 180° C.

Table 1-continued

| Tetrazole | time (in min.) | 15 | 30 | 45 | 60 | 75 | 90 |
|---|---|---|---|---|---|---|---|
| Yellowness Index after ageing at 180° C. | | | | | | | |
| 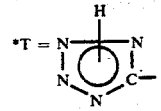 (T—phenyl—T) | | 6 | 39 | 57 | 72 | 86 | 95 | >100 |
| T—(CH₂)₃—T | | 4 | 7 | 15 | 21 | 27 | | |
| T—(CH₂)₂—S—(CH₂)₂—T | | 4 | 11 | 33 | 65 | | | |
| T—(CH₂)₄—T | | 5 | 16 | 21 | 31 | | | |
| T—CH₂CH₂—OH | | 3 | 14 | 37 | 85 | >100 | | |

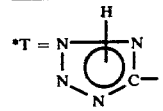

EXAMPLE 2

A dry blend consisting of 100 parts of S-PVC (K value 64), 0.2 parts of montan wax, 1 part of glycol monofatty acid ester, 2 parts of epoxidised soy bean oil (Reoplast 39), and 1.5 parts of tetrazole stabiliser, is rolled for 5 minutes at 170° C. on a mixer roll and then samples of sheet with a thickness of 0.3 mm are taken.

The samples are subjected to heat in an oven at 180° C. and every 3 minutes the thermal ageing of a sample is determined according to the Yellowness Index (YI) of ASTM D 1925-70.

As comparison, rolled sheets containing thiodiethylene glycol-bis-β-aminocrotonate as stabiliser are prepared from the same dry blend. The results are reported in Table 2.

| Stabiliser | Yellowness Index after | | | | | | | | | | | | | |
|---|---|---|---|---|---|---|---|---|---|---|---|---|---|---|
| | 3 | 6 | 9 | 12 | 15 | 18 | 21 | 24 | 27 | 30 | 33 | 36 | 39 | 42 min |
| comparison | 8 | 13 | 19 | 26 | 31 | 37 | 43 | 47 | 54 | 62 | | | | |
| T—(CH₂)₄—T* | 14 | 15 | 18 | 21 | 26 | 28 | 30 | 34 | 37 | 41 | 43 | 46 | 50 | 59 |

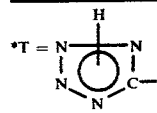

EXAMPLE 3

A dry blend consisting of 100 parts of S-PVC (K-value 64), 20 parts of dioctyl phthalate and 1.5 parts of Ca/Zn stearate is mixed with 1 part of tetrazole stabiliser. Rolled sheets of 0.33 thickness are prepared and tested as in Example 1. The results are reported in Table 3.

| Stabiliser | Zeit (Min.) | 15 | 30 | 45 | 60 | 75 | 90 |
|---|---|---|---|---|---|---|---|
| | | Yellowness Index | | | | | |
| Composition | | 10 | >100 | | | | |
| T—(CH₂)₄—T* | | 6 | 23 | 48 | 86 | >100 | |
| T—(CH₂)₂—S—(CH₂)₂—T | | 13 | 15 | 24 | 36 | 69 | 97 | >100 |
| T—(CH₂)₃—T | | 6 | 10 | 27 | 65 | 100 | |

What is claimed is:

1. A moulding material consisting of a chlorine-containing thermoplastic which is a homopolymer or copolymer of vinyl chloride or a postchlorinated polyolefin into which there is incorporated an effective amount of a tetrazole heat stabiliser, said moulding material containing an epoxy plasticiser and/or at least one carboxylate or phenolate of barium, cadmium, zinc or calcium and, as heat stabiliser, at least one mono- or bistetrazole of the formula I

wherein $R^1$ represents a hydrogen atom, alkyl of 1 to 4 carbon atoms, cycloalkyl of 5 or 6 carbon atoms, phenyl, or phenyl which is substituted by alkyl of 1 to 4 carbon atoms or halogen, n is 1 or 2, and, when n is 1, R represents alkyl of 1 to 20 carbon atoms which can be interrupted by oxygen, —NY—, sulfur, $SO_2$ and/or $CO_2$, or substituted by —OH or —SH, or represents phenyl or benzyl which can be substituted by alkyl of 1 to 4 carbon atoms, or is cycloalkyl of 5 or 6 carbon atoms, and, when n is 2, R represents a direct bond, alkylene of 1 to 10 carbon atoms which can be substituted by phenyl, benzyl, hydroxyl, alkoxy of 1 to 4 carbon atoms, acyloxy of 1 to 20 carbon atoms, phenylsulfonyl or alkylsulfonyl, or interrupted by oxygen, sulfur, $SO_2$, $CO_2$ or —NY—, or represents alkylidene of 1 to 10 carbon atoms, phenylene, benzylene or xylylene, and Y represents hydrogen, alkyl of 1 to 4 carbon atoms, phenyl, benzyl, naphthyl, cyclohexyl or acyl of 1 to 20 carbon atoms.

2. A moulding material according to claim 1, wherein $R^1$ is a hydrogen atom.

3. A moulding material according to claim 1, wherein n is 1 and R represents alkyl of 1 to 12 carbon atoms which can be interrupted by oxygen, sulfur and/or $CO_2$ or substituted by OH or SH, or represents phenyl or benzyl.

4. A moulding material according to claim 1, wherein n is 1 and R represents alkylene which is substituted by phenyl, hydroxyl, acyloxy of 1 to 18 carbon atoms, or alkylene which is interrupted by oxygen, sulfur, $CO_2$ or —NY—, in which Y represents a hydrogen atom, alkyl of 1 to 4 carbon atoms, phenyl or acyl of 1 to 18 carbon atoms.

5. A moulding material according to claim 1, wherein, when n is 1, R represents alkyl or hydroxyalkyl of 1 to 6 carbon atoms, and, when n is 2, represents alkylene of 2 to 6 carbon atoms which can be interrupted by oxygen or sulfur or substituted by hydroxyl, or represents phenylene, benzylene or xylylene.

6. A moulding material according to claim 1, wherein, when n is 2 in formula I, $R^1$ represents a hydrogen atom and $R^2$ represents alkylene of 2 to 4 carbon atoms or 3-thiapentylene.

7. A moulding material according to claim 1, which contains 0.05 to 5% by weight of a mono- or bistetrazole of the formula I and at least 0.05% by weight of an epoxy plasticiser or 0.05 to 5% by weight of at least one carboxylate or phenolate of barium, calcium, zinc or cadmium, based on the chlorine-containing thermoplastic.

8. A moulding material according to claim 1, wherein the epoxy plasticiser is epoxidised soya bean oil.

9. A moulding material according to claim 1, which contains, as metal salts, combinations of barium and cadmium salts or calcium and zinc salts.

10. A method of stabilising a chlorine-containing thermoplastic which is a homopolymer or copolymer of vinyl chloride or a postchlorinated polyolefin against degradation by the action of heat, which comprises incorporating thereinto an effective amount of a mono- or bistetrazole of the formula I together with at least one co-stabiliser selected from those indicated in claim 1.

11. A moulding material according to claim 7 which contains 0.1 to 3% by weight of a mono- or bistetrazole of the formula I and at least 0.05 by weight of an epoxy plasticizer or 0.1 to 3% by weight of at least one carboxylate or phenolate of barium, calcium, zinc or cadmium, based on the chlorine-containing thermoplastic.

* * * * *